April 12, 1932. W. G. HUMPHREYS ET AL 1,853,308
SPROCKET WHEEL
Filed April 12, 1930 2 Sheets-Sheet 1
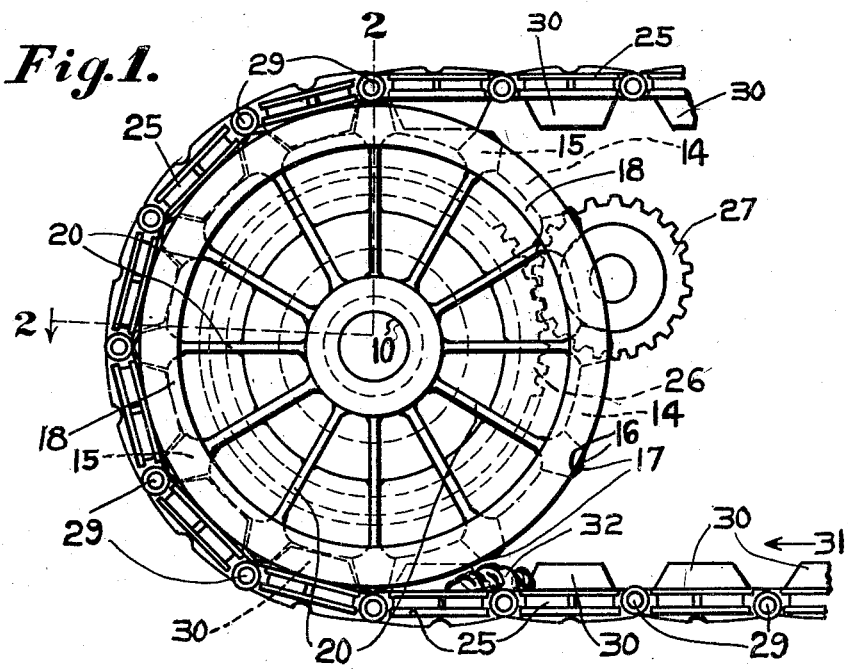
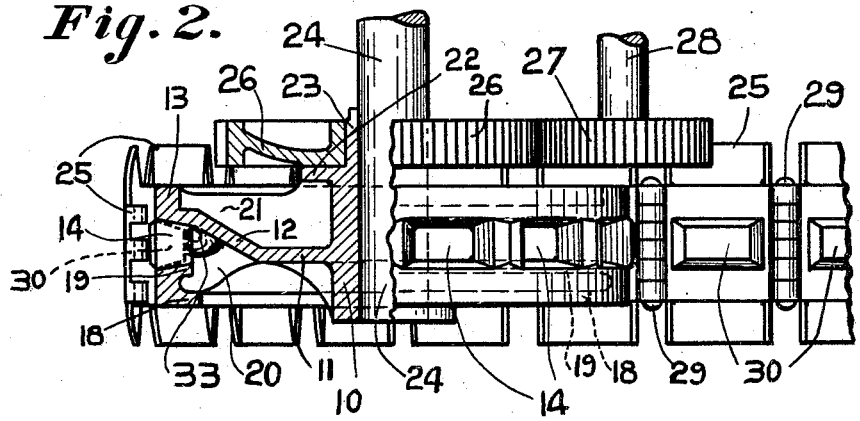
Inventors
O. R. Humphreys
W. G. Humphreys
By Arthur H. Sturges
Attorney

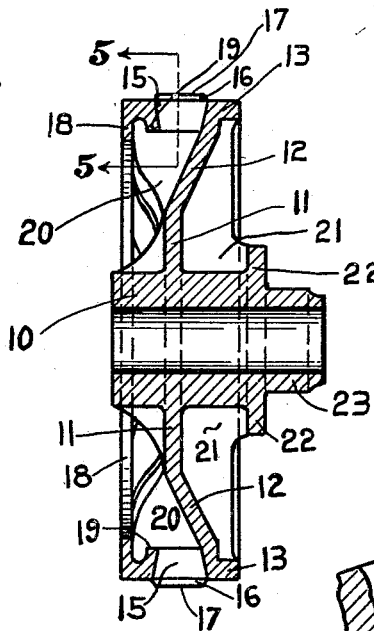
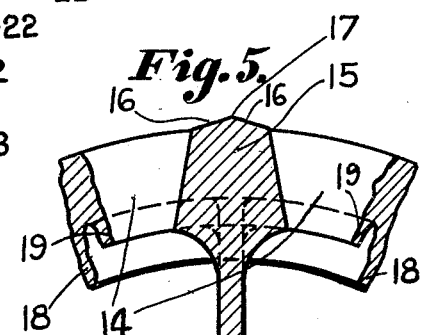
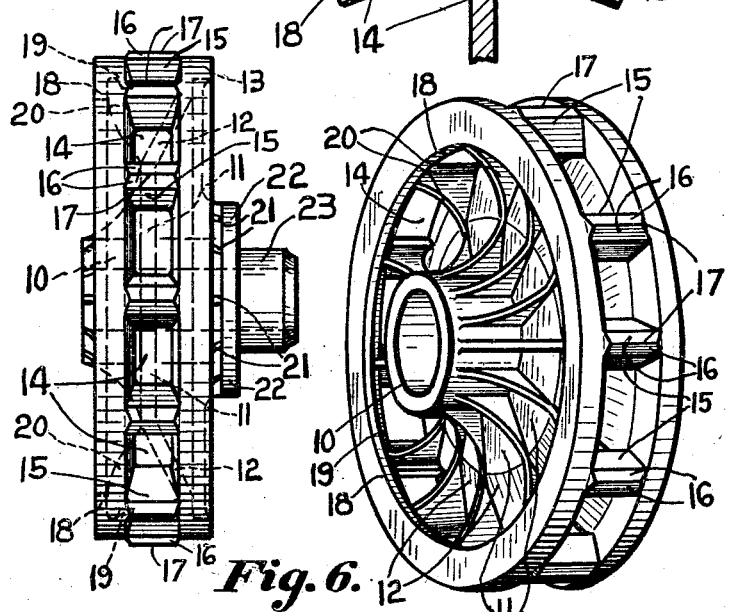

Patented Apr. 12, 1932

1,853,308

UNITED STATES PATENT OFFICE

WALTER G. HUMPHREYS AND OMAR R. HUMPHREYS, OF OMAHA, NEBRASKA

SPROCKET WHEEL

Application filed April 12, 1930. Serial No. 443,718.

The present invention relates to improvements in sprocket wheels, and has for an object to provide an improved sprocket wheel for use in connection with endless chain treads adapted for heavy land vehicles, such as tractors in which mud, earth and other foreign matter adhering to the chain will not clog the improved sprocket wheel, result in the breakage of the chain or have any untoward effect in the normal operation of the mechanism.

Another object of the invention is to provide an improved sprocket wheel so constructed as to clean itself of mud and foreign substances and move such substances outwardly of the vehicle and free of the chain.

A further object of the invention is to provide an improved self-clearing sprocket wheel rigidly and strongly constructed and having through peripheral passages which open inwardly upon one side only of the sprocket wheel, such side being directed away from the gearing and shafting by which the sprocket wheel is driven.

A still further object of the invention is to provide a compact and inexpensive form of wheel in which the formation of the peripheral passages will in no wise impair the rigidity and strength of the wheel.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of an improved sprocket wheel constructed according to the present invention and showing a fragment of a traction chain applied thereto.

Figure 2 is a horizontal section taken on the line 2—2 in Figure 1.

Figure 3 is a vertical section taken through the wheel.

Figure 4 is an edge view of the wheel.

Figure 5 is a fragmentary longitudinal section taken through a portion of the periphery of the wheel, and Figure 6 is a perspective view of the improved wheel.

Referring more particularly to the drawings, 10 designates the hub of the improved wheel, and 11 represents generally the web or disc, which is cast or otherwise affixed to the hub 10 and normally extends out to support the rim of the wheel. In this instance, however, the web or disc 11 extends centrally from the hub 10, but only for a relatively short radial distance and it then continues outwardly in a substantially diagonal direction to provide the outer diagonal section 12, the outer end of which extends to one side of the center of the wheel. The rim of the wheel is represented generally at 13, and this rim is provided with spaces or through passages 14 made radially through the inner and outer portions of the rim 13 and on opposite sides of the teeth 15, the outer surfaces of which are preferably formed with the outwardly convergent faces 16 meeting in the ridge or apex 17. This ridge 17 extends transversely of the wheel, as shown in Figure 6, and the inclined faces 16 also extend laterally of the teeth to the extent thereof. The rim 13 is provided with a depending flange 18 at its outer edge, this being the edge of the rim on the opposite side of the openings 14 from the diagonal disc section 12.

This flange 18 tends to reinforce and strengthen the rim construction, especially at that part remote from the connection of the rim with the disc or web. Also preferably there is a flange 19 projecting inwardly from the rim 13 at that side of the through passages 14 opposite to the disc section 12. This inner flange is spaced from the outer flange 18 and serves to form a substantial channel construction at one side of the rim 13 for reinforcing and strengthening the same.

Moreover ribs 20 are cast or otherwise formed upon the hub 10, the disc and its diagonal section and the rim 13. These ribs extend as to their width substantially at right angles to the plane of the web or disc and they are spaced apart as indicated in Figure 6. They contribute to constitute a strong and rugged construction to the entire wheel assembly.

Moreover similar reinforcing ribs 21 are formed upon the opposite sides of the web or disc and they are also connected with the hub 10 and with the rim portion 13 at this side of the disc. An outwardly extending flange 22 is made upon the hub 10 at the inner side of the wheel and preferably outside the perimeter of the rim 13, the ribs 21 being connected with this flange 22.

This flange 22 serves to reinforce and strengthen the hub and the rib construction and it also tends to separate the main hub portion from the extension hub 23 which extends coaxial with the main hub and is preferably cast therewith.

As shown more particularly in Figures 1 and 2, a shaft 24 carries the hub 10 of the sprocket wheel, this shaft being that ordinarily provided on tractors and like vehicles for receiving the sprocket wheels over which the endless chain threads 25 are adapted to move.

As shown in Figure 2, a gear wheel 26 is sweated, shrunk or otherwise fixedly mounted upon the extension hub 23 and against the flange 22. This gear wheel 26 is disposed in mesh with a pinion 27 on a drive or jack shaft 28, which is driven by the motor of the tractor or other appropriate source.

The chains 25 are made up of links hinged together, as indicated at 29, and teeth 30 are provided upon the chain adapted to intermesh with the teeth 15 of the sprocket wheel and to fit within the through passages 14 in the rim of the improved sprocket wheel.

In the operation of the device, it will be understood that the chain 25 becomes clogged with soft mud and earth or with other foreign matter in a manner, whereby the chain is liable to become broken by reason of the earth and other foreign matter lodging between the links and piling up between the chain and its sprocket wheel. Assuming that the chain moves in the direction of the arrow 31 in Figure 1, the clod of earth indicated at 32 having attached itself to the chain will become compressed and squeezed by contact with the teeth 15 of the sprocket wheel. A clod of earth is indicated at 33 in Figure 2 as having been pushed by one of the teeth 30 of the chain into and past a through passage 14 of the sprocket wheel. This clod of earth 33 is illustrated in Figure 2 as being received against the inclined disc section 12 of the wheel and is in the act of being guided laterally of the wheel by such inclined section and between the spaced ribs 20. The clod 33 will ride outwardly upon the inclined section 12 and be discharged laterally of the wheel.

This lateral or axial discharge of the accumulated matter it will be noticed occurs at one side only of the wheel, namely at that side away from the shaft 24 and the gears 26 and 27 so that any likelihood of the stoppage of the mechanism by reason of accumulation of foreign matter is avoided. The outer diagonal disc section 12 is continuous and imperforate so that the mud, earth or other foreign matter will not be allowed to pass to the inside of the wheel but must be discharged away from the mechanism. The discharge will take place outwardly beyond the hub 10 so as to avoid any accumulation of earth and mud about the hub which might build up and gradually close the through passages 14.

It will be noted from an inspection of Figure 3 that the ribs 20 are curved from the hub 10 and from the rim 13 inwardly of the wheel toward the intermediate portion of the disc or web and they substantially meet therewith at the point of divergence of the outer section 12 away from the normal inner section 11 of the disc, so that at this intermediate point the strengthening ribs 20 substantially do not exist. This removes all surfaces to which the clod of earth might cling and to this extent insures the freeing of the clod of earth and its entire separation from the wheel.

We do not wish to be restricted to the size, form, and proportions of the various parts, and obviously changes could be made in the construction herein described without departing from the spirit of the invention, it being only necessary that such changes fall within the scope of the appended claims.

What is claimed is:—

1. An improved sprocket wheel comprising a hub, a disc having an inner radial portion extending substantially centrally and at approximately right angles from said hub and further having an outer radial portion extending diagonally from the first mentioned disc portion, a rim connected at one side to the outer part of the diagonal section, said rim having teeth and alternate peripheral openings therethrough, the axes of which are in line with the diagonal section of the disc, and spaced ribs extending laterally of the wheel and connected between the hub, disc and the rim, said ribs having in-curved parts extending substantially to the circle of joinder between the two parts of the disc.

2. An improved sprocket wheel comprising a hub, a disc extending therefrom and having a diagonal outer portion, a rim on the disc having teeth with through peripheral passages between the teeth, said disc connecting with the rim at one side of the passages, spaced flanges extending inwardly from the portion of the rim on the other side of said passages, and ribs extending on both sides of said disc and connecting with the hub and the rim.

3. An improved sprocket wheel comprising a hub, a disc thereon having an outer diagonal part, a rim connected at one side with the diagonal part of the disc and having teeth and through openings at opposite sides of the teeth, ribs at opposite sides of said disc connecting the hub and rim, a separation flange extending outwardly from said hub and being coupled with the ribs at that side, and an extension hub extending axially from the main hub and beyond said flange.

In testimony whereof, we affix our signatures.

WALTER G. HUMPHREYS.
OMAR R. HUMPHREYS.